Patented Nov. 17, 1953

2,659,760

UNITED STATES PATENT OFFICE 2,659,760

BROMINATION OF BENZENE-SERIES HYDROCARBONS

Ludo K. Freyel and John William Hedelund, Midland, Mich., assignors to The Dow Chemical Company, Midland, Mich., a corporation of Delaware No Drawing. Application March 30, 1950, Serial No. 152,982

10 Claims. (Cl. 260—650)

This invention relates to the bromination of benzene-series hydrocarbons and halogenated benzene-series hydrocarbons.

It was known before our invention that benzene-series hydrocarbons could be brominated by the action of molecular bromine in the presence of certain amphoteric metal halides as catalysts. However, in such a bromination, there is an induction period of from 20 to 60 minutes after addition of the bromine before reaction begins. Because of this induction period, it has been impossible to conduct such catalytic brominations continuously. Furthermore, great care was required in carrying out the bromination because of the violence of reaction at the end of the induction period. Additional serious difficulty is encountered in the process because the amphoteric metal halide does not separate readily from the reaction products but instead forms a persistent emulsion.

The principal object of the present invention is to provide a method for the bromination of benzene-series hydrocarbons and halogenated benzene-series hydrocarbons which overcomes the disadvantages of the previously known method. More specific objects and advantages are apparent from the description which illustrates and discloses, but is not to be construed as limiting, the invention.

According to the invention a hydrocarbon or halohydrocarbon of the class consisting of hydrocarbons of the benzene-series having not more than two nuclear alkyl substituents and mono- and di- nuclear halogen substitution products thereof is brominated by an improved method. When the compound to be brominated is a halo hydrocarbon, each halogen has an atomic weight less than 80. The bromination is accomplished by contacting bromine with a solution that consists essentially of (1) at least 0.05 per cent of hydrogen bromide, and (2) at least 0.01 per cent of aluminum chloride, aluminum bromide, ferric chloride or ferric bromide in (3) the compound to be brominated. (The terms "parts" and "per cent" are used herein to refer to parts and per cent by weight, unless otherwise indicated.)

As is hereinbefore indicated, the improved method of the invention can be employed to brominate a hydrocarbon of the benzene-series having not more than two nuclear alkyl substituents or a mono- or di- nuclear halogen substitution product thereof. "Hydrocarbon of the benzene series" is used herein in its usual sense, namely to define benzene and substituted benzenes which differ from benzene only by the structural unit CH₂, or a multiple thereof. Accordingly, the term "hydrocarbons of the benzene series having not more than two nuclear substituents" includes benzene, monoalkyl-substituted benzenes and dialkyl-substituted benzenes (i. e., benzene, mono- and di-methylbenzenes, mono- and di-ethylbenzenes, mono- and di-propylbenzenes, mono- and di-isopropylbenzenes, mono- and di-butylbenzenes, and the like). Similarly, the term "mono- and di- nuclear halogen substitution products thereof wherein the halogen has an atomic weight less than 80" includes mono- and di- nuclearly halogenated benzenes, mono-alkyl-substituted benzenes, and dialkyl-substituted benzenes in which the halogen substituent is chlorine, bromine or fluorine. It is usually preferred, as a practical matter, that no alkyl substituent have more than six carbon atoms.

As is hereinbefore stated, a solution is formed by dissolving at least 0.05 per cent of hydrogen bromide in the compound to be brominated. Larger amounts of hydrogen bromide up to the maximum amount that is soluble in the starting material are equally effective. It is usually most convenient to saturate the starting material with hydrogen bromide.

In addition to hydrogen bromide, as is hereinbefore indicated, an amphoteric metal halide of the group consisting of aluminum chloride, aluminum bromide, ferric chloride and ferric bromide is dissolved in the compound to be brominated according to the process of the invention. The amount of the amphoteric metal halide dissolved is at least 0.01 per cent of the compound to be brominated, and may be the maximum amount soluble therein. Ordinarily it is preferred that not more than 0.2 per cent of the halide be dissolved in the compound to be brominated. The halide is usually added per se, but may be formed in situ by reaction of the hydrogen bromide with the appropriate metal or metal salt.

It is ordinarily feasible to carry out bromination in accordance with the invention at a temperature between 10° C. and 80° C. Below 10° C. the rate of bromination is very slow, while above 80° C. bromine is vaporized excessively. It is usually desired, in order to achieve rapid bromination and to minimize bromine vaporization, to carry out the reaction at a temperature between 25° C. and 55° C. Bromination proceeds most advantageously at atmospheric pressure, but can be accomplished either at superatmospheric pressures or under vacuum.

When bromination is accomplished according to the method of the invention at a temperature as high as about 25° C. reaction takes place almost instantaneously, so that a contact time of only a fraction of a second is operable. If a reaction temperature lower than 25° C. is employed it is desirable to allow from 5 to 10 seconds for bromination to occur. In carrying out bromination according to the invention, the ratio of bromine to compound to be brominated is ordinarily selected from within the range usually employed for batchwise brominations of the prior art (i. e., from 50 to 75 per cent of the bromine theoretically required to accomplish the desired extent of bromination is ordinarily used). The reaction is operable for accomplishing monobromination, dibromination or tribromination, and the extent to which bromination is carried depends principally upon the proportion of bromine employed. Since an insufficiency of bromine is usually employed, it is advantageous to recycle unreacted starting material when a monobromination is to be accomplished, starting material and monobrominated material when dibromination is to be accomplished and monobrominated and dibrominated material when tribromination is to be accomplished.

Bromination according to the method of the invention is carried out in the absence of light, and is nuclear bromination. It is not essential that extreme care be taken to avoid all light, because the opacity of bromine prevents catalysis of side-chain bromination by weak light. The reaction is conveniently effected in an iron reactor, although a glass lined reactor can be employed, as is essential in the prior art method.

The following examples illustrate and disclose preferred embodiments, but are not to be construed as limiting the invention:

EXAMPLE 1

A hydrocarbon of the benzene series having not more than two nuclear substituents was brominated according to the following procedure:

Toluene (a total of 405 grams) was saturated with anhydrous ferric chloride and anhydrous hydrogen bromide. Reaction was then effected by mixing a stream of the saturated toluene with a stream of liquid-phase bromine (a total of 914 grams was used) at room temperature in a horizontal tubular reactor having a series of weirs to prevent free flow of the liquids through the tube; the bromine was added through a tube extending through about one-third the length of the reactor, and having openings along its full length. The toluene and the bromine were added over a period of 61 minutes and the reactor was maintained about half full of liquid so that the total utilized reaction volume was approximately 110 cc. Products removed from the reactor were collected in a round bottom flask equipped with a reflux condenser. When all the bromine and toluene had been added the reactor was drained into the flask, and the reaction products were heated to separate hydrogen bromide therefrom. The remaining liquid in the round bottom flask was then washed twice with distilled water and once with about a 10 per cent solution of sodium carbonate. Fractionation of the bromination products yielded 29 grams of toluene, 369 grams of monobromotoluene, 346 grams of dibromotoluene and 68 grams of tribromotoluene.

A procedure similar to that described in the preceding paragraph was carried out using 249 grams of toluene, 755 grams of bromine, and a total reaction time of 60 minutes. Fractionation of the products remaining after washing yielded 8 grams of toluene, 153 grams of monobromotoluene, 250 grams of dibromotoluene and 185 grams of tribromotoluene.

EXAMPLE 2

A series of brominations was conducted to show the applicability of the method of the invention to the production of a product substantially monobrominated or substantially dibrominated, according to the needs for these products, and to show the applicability thereof to the bromination of nuclearly halogenated compounds. Toluene was brominated by a one-step bromination, by a two-step bromination, and by a three-step bromination; the reaction was carried out by a procedure similar to that described in the first paragraph of Example 1. When bromination was accomplished stepwise all the toluene was subjected to the action of a portion of the bromine, and then the reaction products were subjected to the action of the remainder of the bromine. The results of this series of brominations are presented in Table 1, below, which shows the amount of bromine, the amount of toluene, the number of passes (or bromination reactions), and the amounts of products produced.

Table 1

| Run No. | A | B | C |
|---|---|---|---|
| Grams of bromine employed | 368 | 780 | 1,176 |
| Grams of toluene employed | 433 | 424 | 423 |
| Number of passes | 1 | 2 | 3 |
| Reaction time in minutes (per pass) | 21 | 22 | 20 |
| Grams of toluene recovered | 204 | 23 | 13 |
| Grams of monobromotoluene recovered | 380 | 627 | 258 |
| Grams of dibromotoluene recovered | 10 | 139 | 423 |
| Grams of tribromotoluene recovered | 0 | 6 | 312 |

EXAMPLE 3

A procedure similar to that described in the first paragraph of Example 1 was employed to brominate benzene (48.9 parts), saturated with HBr and ferric chloride, by the action of bromine (51.1 parts). Fractionation of the final product yielded 21 parts of benzene, 45 parts of monobromobenzene and 4 parts of dibromobenzene.

EXAMPLE 4

A procedure similar to that described in the first paragraph of Example 1 was employed to brominate p-xylene (199 grams), saturated with HBr and ferric chloride, by the action of bromine (196 grams); reaction was completed in 19 minutes. The fractionation of the final product yielded 88.3 grams of unreacted xylene, 117.9 grams of monobromoxylene, 61.9 grams of dibromoxylene and 10.7 grams of higher boiling materials and residue.

EXAMPLE 5

A procedure similar to that described in the first paragraph of Example 1 was used to brominate 1-methylbutylbenzene (147 grams), saturated with HBr and ferric chloride, by the action of bromine (131 grams); reaction was completed in 12 minutes. The fractionation of the final product yielded 77.7 grams of unreacted 1-methylbutylbenzene, 92.1 grams of bromo(1-methylbutyl)benzene and 26.2 grams of higher boiling materials and residue. Infrared analysis of the brominated material indicated that it is about 75 per cent p-bromo(1-methylbutyl)benzene and that the rest is probably the ortho compound. Bromo(1-methylbutyl)benzenes are believed to be new compounds. The mono-brominated product had a density of 1.2125 at 25° C., and boiled at 103° C. at 5 mm. Hg.

We claim:

1. A method of brominating a compound of the class consisting of hydrocarbons of the benzene series having not more than two nuclear alkyl substituents and mono- and di- nuclear halogen substitution products thereof wherein the halogen has an atomic weight less than 80 that comprises contacting bromine with a preformed solution consisting essentially of (1) at least 0.05 per cent of hydrogen bromide and (2) at least 0.01 per cent of an amphoteric metal halide of the group consisting of aluminum chloride, aluminum bromide, ferric chloride and ferric bromide in (3) the compound to be brominated.

2. A method as claimed in claim 1 in which the preformed solution contains from 0.01 to 0.2 per cent of the amphoteric metal halide.

3. A method as claimed in claim 2 in which the preformed solution is saturated with hydrogen bromide.

4. A method as claimed in claim 3 in which the compound brominated is benzene.

5. A method as claimed in claim 3 in which the compound brominated is toluene.

6. A method as claimed in claim 3 in which the compound brominated is a xylene.

7. In a method of brominating a compound of the class consisting of hydrocarbons of the benzene series having not more than two nuclear alkyl substituents and mono- and di-nuclear halogen substitution products thereof wherein the halogen has an atomic weight less than 80, in the presence of an amphoteric metal halide of the group consisting of aluminum chloride, aluminum bromide, ferric chloride and ferric bromide, the improvement that consists of dissolving at least 0.05 per cent of hydrogen bromide and at least 0.01 per cent of the amphoteric metal halide in the compound to be brominated and accomplishing the bromination by adding liquid bromine to the resulting solution at a temperature between 10° and 80° C.

8. In a method of brominating a compound of the class consisting of hydrocarbons of the benzene series having not more than two nuclear alkyl substituents and mono- and di-nuclear halogen substitution products thereof wherein the halogen has an atomic weight less than 80 by contacting the said reactant with bromine in the presence of at least 0.01 per cent of an amphoteric metal halide of the group consisting of aluminum chloride, aluminum bromide, ferric chloride and ferric bromide, a procedure for eliminating the induction period normally required to initiate bromination which comprises dissolving at least 0.05 per cent of hydrogen bromide in the reactant prior to contacting it with bromine.

9. A continuous method for brominating a reactant of the class consisting of hydrocarbons of the benzene series having not more than two nuclear alkyl substituents and mono- and di-nuclear halogen substitution products thereof wherein the halogen has an atomic weight less than 80 which consists in forming a mixture of (1) at least 0.05 per cent of hydrogen bromide and (2) at least 0.01 per cent of an amphoteric metal halide of the group consisting of aluminum chloride, aluminum bromide, ferric chloride and ferric bromide with (3) the reactant, passing the resulting mixture in stream form through a reaction zone wherein it is maintained at a temperature between 10° and 80° C. and therein introducing liquid bromine into the flowing stream, and separating brominated reactant from the effluent from the zone.

10. A process according to claim 9 wherein the reaction temperature is maintained between 25° and 55° C.

LUDO K. FREVEL.
JOHN WILLIAM HEDELUND.

References Cited in the file of this patent

UNITED STATES PATENTS

| Number | Name | Date |
| --- | --- | --- |
| 2,257,903 | Dreisbach | Oct. 17, 1941 |
| 2,273,467 | Dreisbach | Feb. 17, 1942 |

FOREIGN PATENTS

| Number | Country | Date |
| --- | --- | --- |
| 108,424 | Austria | Dec. 27, 1927 |